July 23, 1968    Z. OLSON    3,393,716
MULTIPLE DRINK MIXER AND DISPENSER
Filed Sept. 16, 1965    3 Sheets-Sheet 1

INVENTOR
ZYGMUNT OLSON
BY Edward M. Apple
ATTORNEY

INVENTOR
ZYGMUNT OLSON
BY Edward M. Apple
ATTORNEY

July 23, 1968  Z. OLSON  3,393,716
MULTIPLE DRINK MIXER AND DISPENSER
Filed Sept. 16, 1965  3 Sheets-Sheet 3
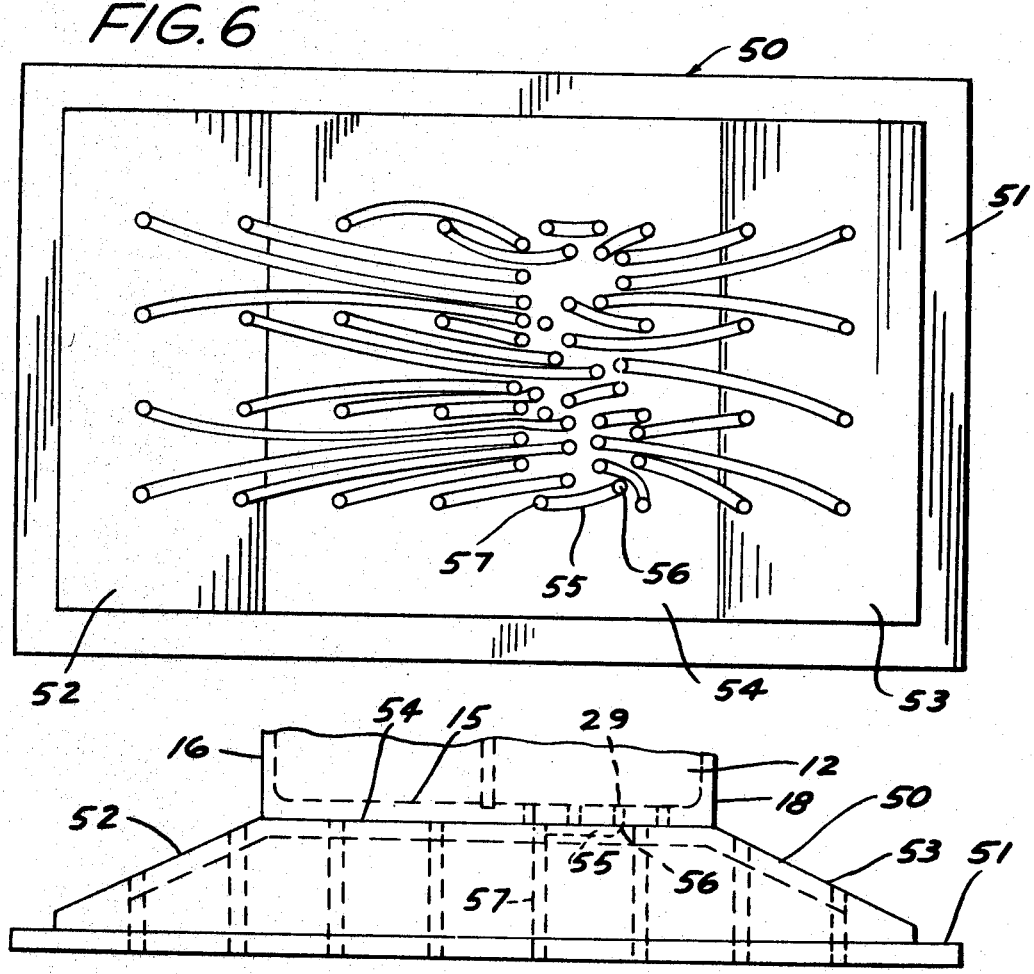
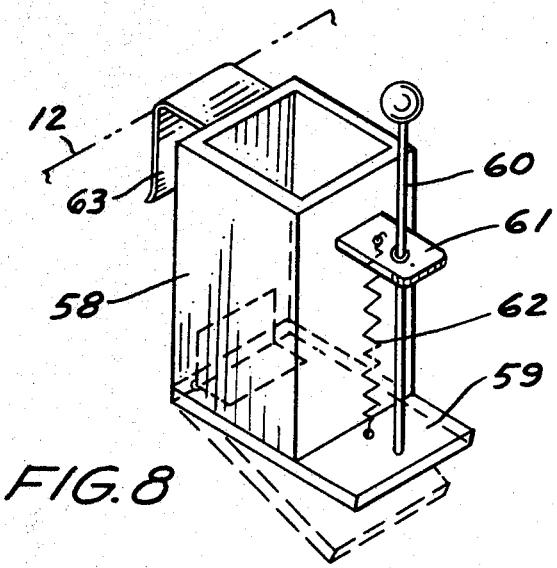
INVENTOR.
ZYGMUNT OLSON
BY Edward M. Apple
ATTORNEY United States Patent Office 3,393,716
Patented July 23, 1968

3,393,716
MULTIPLE DRINK MIXER AND DISPENSER
Zygmunt Olson, 6725 Michigan Ave.,
Detroit, Mich. 48210
Filed Sept. 16, 1965, Ser. No. 487,722
1 Claim. (Cl. 141—237)

ABSTRACT OF THE DISCLOSURE

This application discloses a portable, multiple, drink mixing and dispensing device, in which the drink ingredients are each received in a separate compartment, then mixed in one of the compartments, and finally a multiplicity of mixed drinks is then dispensed, simultaneously, into a multiplicity of individual glasses, which are held in a removable tray positioned in a lower compartment. The invention resides in the particular combination and arrangement which produces a lightweight, portable device, which is easily assembled and disassembled for cleaning and replacement of parts, and which enables a bartender, or host, to rapidly mix and dispense a large number of mixed drinks simultaneously.

---

This invention relates to bar equipment and has particular reference to a device for simultaneously mixing and dispensing a plurality of mixed drinks.

An object of the invention is to provide a device of the character indicated which is intended for use by bartenders, caterers, and hosts, who are faced with the problem of dispensing drinks to a large number of persons at a party or the like.

Another object of the invention is to provide a device of the character indicated which is compact, light in weight, readily portable, economical to manufacture, simple in construction, and efficient in use.

Another object of the invention is the provision of a device of the character indicated which is capable of mixing and dispensing as many as thirty-two drinks, or as few as eight drinks, at a time.

Another object of the invention is the provision of a device of the character indicated which is provided with a removable tray, having recesses in its face for accommodating as many as 32 glasses, which are held in properly located and properly spaced relation for simultaneously receiving the ingredients of the mixed drinks.

Another object of the invention is the provision of a device of the character indicated which is provided with means for measuring the ingredients for drinks in multiples of 8, 16, 24 or 32.

Another object of the invention is the provision of a device of the character indicated which is provided with removable measuring receptacles with means thereon to attach them to the device, and means for quickly discharging their contents.

Another object of the invention is the provision of a device of the character indicated which operates entirely by gravity.

The foregoing and other objects and advantages of the invention will become more apparent as the description proceeds, reference being made from time to time to the accompanying drawings, forming part of the within disclosure, in which drawings:

FIG. 6 is a plan view of a modified form of distribution member arranged to be positioned between the upper and lower compartments, and containing dispensing grooves and discharge ports in order to obviate the use of the tubes illustrated in FIG. 2.

FIG. 7 is an elevational view of the modified member shown in FIG. 6, in position beneath the top compartment 12.

FIG. 8 is a perspective view of one of the measuring cups, used in the device to measure the ingredients of fewer than thirty-two drinks.

Figure 1:
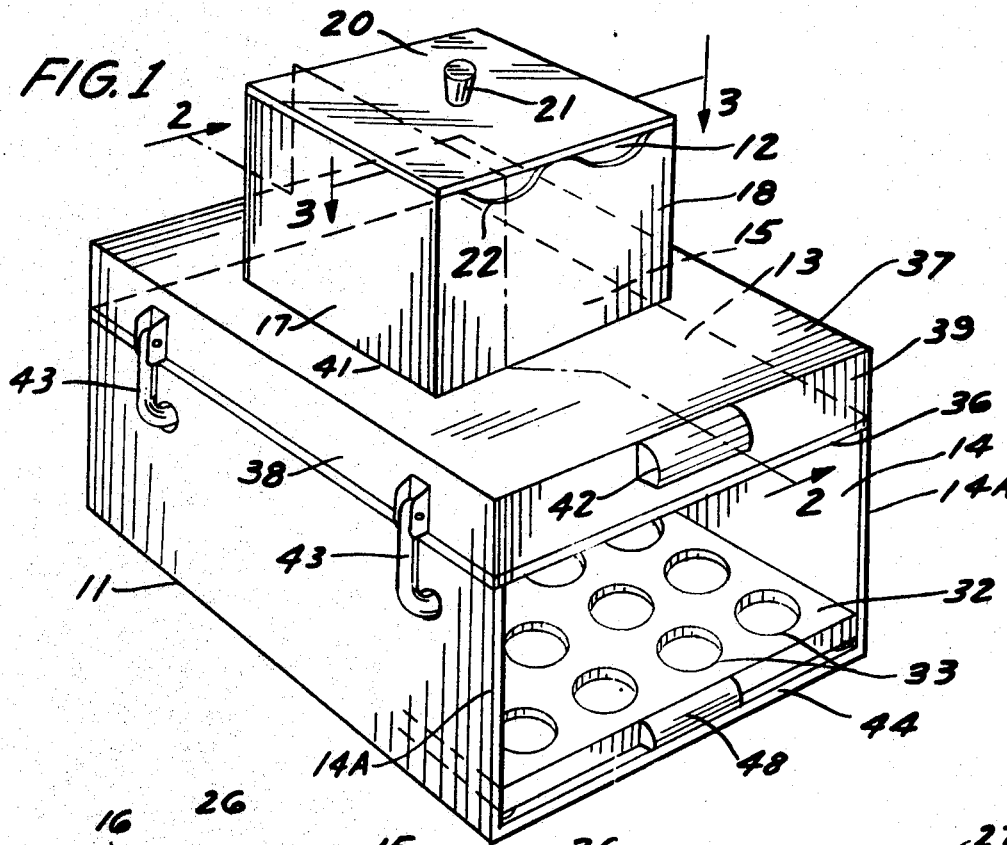
FIG. 1 is a perspective view of a device embodying the invention, with the top cover in place and the front cover removed in order to make visible a portion of the interior and the glass supporting tray.

Referring now more particularly to the drawings, it will be understood that in the embodiment herein disclosed the reference character 11 indicates in general the device embodying the invention, which comprises three compartments 12, 13 and 14.

The compartment 12 consists of a bottom 15, and four equal sides 16, 17, 18 and 19, which may be made of wood, metal, plastic, or other suitable material, and secured together by any suitable means. The compartment 12 is provided with a removable dust cover 20 (FIG. 1), having a hand grip 21 which is placed in position when the device is not being used.

The wall 18 is provided with cut outs 22, which serve as a rest for a bottle 23 (FIG. 2), as hereinafter explained.

The compartment 12 is also provided with a removable partition 24 (FIGS. 2, 3, 4 and 5), which partition is arranged to be received in grooves 26 formed in the bottom 15, and in the sidewalls 16, 17, 18 and 19.

Figure 2:
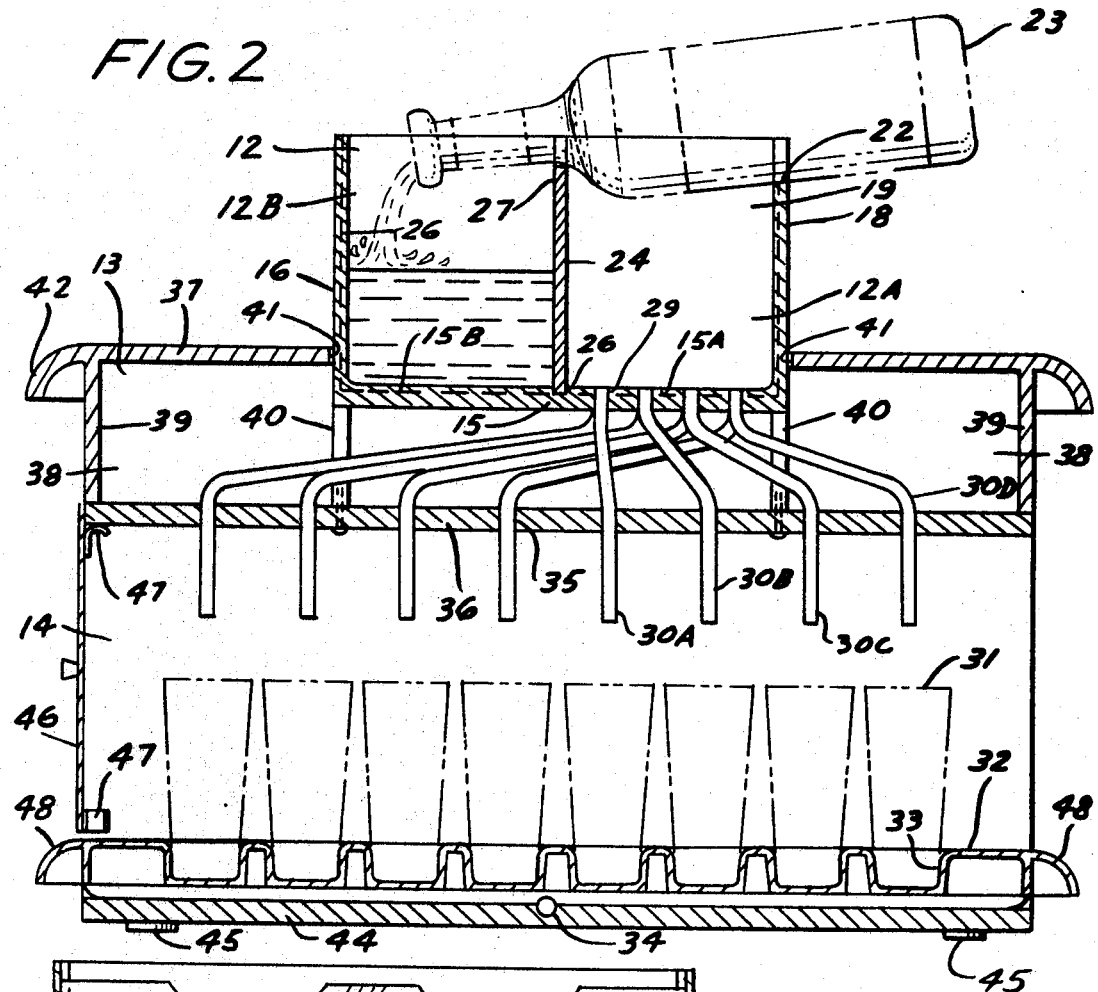
FIG. 2 is a vertical section taken substantially on the line 2—2 of FIG. 1.

The removable partition 24 (FIG. 2) is also provided with a cut out 27, which serves as a cradle for the bottle 23 (FIG. 2). The partition 24 is also provided with a finger hole 28, for lifting the partition out of the grooves 26.

Figures 3, 5:
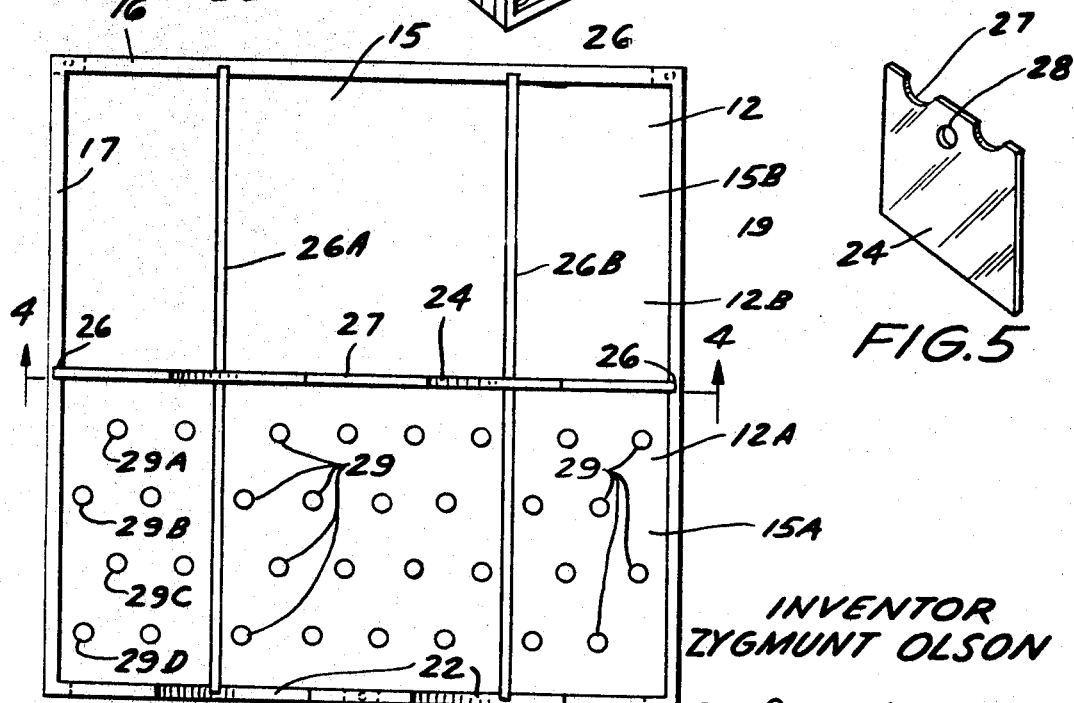
FIG. 3 is a top plan view of the upper compartment in which the ingredients for the drinks are initially placed. This view shows the center removable partition in position.
FIG. 5 is a perspective detail of one of the removable partitions used in the upper compartment.
Figure 4:
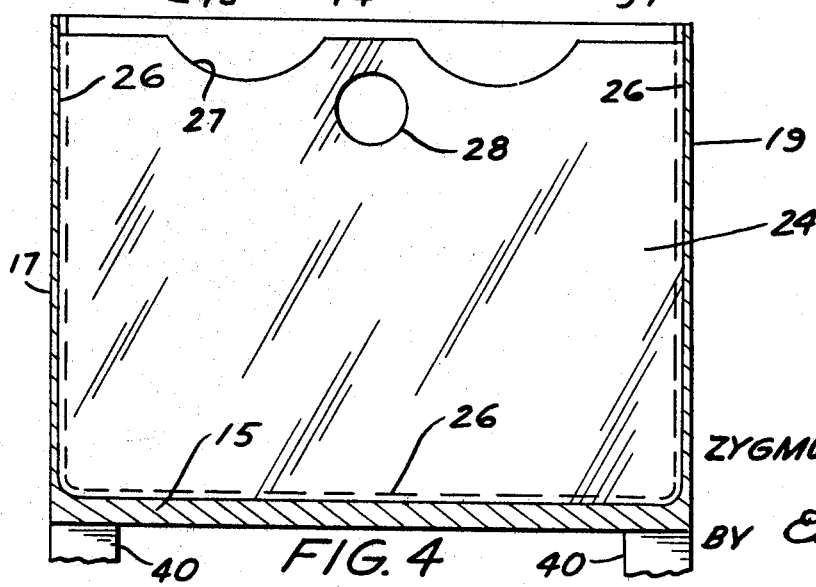
FIG. 4 is a section taken substantially on the line 4—4 of FIG. 3.

It will be understood that the partition 24, when in the position shown in FIGS. 2, 3, and 4, divides the compartment 12 into two equal subcompartments 12A and 12B (FIGS. 2 and 3).

As shown in FIGS. 2 and 3, the bottom 15A of the subcompartment 12A is provided with a plurality of apertures 29, whereas the bottom 15B of the compartment 12B is imperforate.

The partition 24 is used in the position shown in FIGS. 2, 3 and 4, when the device is used to mix and dispense the maximum of thirty-two drinks. When it is desired to mix eight drinks, the partition is placed in either the groove 26A or the groove 26B. If a partition 24 is positioned in both the grooves 26A and 26B, the compartment 12 is divided into three subcompartments, two of which will mix eight drinks each and the center will mix sixteen drinks. When a partition 24 is in each groove 26A and 26B, I prefer to measure the ingredients for the drinks in the measuring receptacles shown in FIG. 7.

I provide two measuring receptacles, as shown in FIG. 7, one for eight drinks and one for sixteen drinks. Without using the measuring receptacles, shown in FIG. 7, the device will mix a maximum of thirty-two drinks, and when the measuring receptacles are used with the dividing partitions as described. I am able to mix eight, sixteen, or twenty-four drinks.

When it is desired to mix the maximum of thirty-two drinks, the partition 24 is positioned as shown in FIGS. 2, 3, and 4, and with the cover 20 removed, a whiskey bottle 23, which contains thirty-two "shots" of whiskey, is positioned in the recesses 22 and 27, so that the contents of the bottle 23 fall into the compartment 12B. When the bottle 23 is empty, the partition 24 is lifted so that the whiskey, or other alcoholic beverage is allowed to flow into the compartment 12A, and hence through the apertures 29, and the plastic tubes 30, into the glasses 31, which are positioned in the compartment 14 on a tray 32, which is specially designed to hold thirty-two glasses.

The tray 32 may be made of plastic or other suitable material, and is provided with thirty-two recesses 33, for receiving the glasses. The recesses are located in properly spaced relation so that when the tray 32 is centered on the stop 34, each one of the recesses 33 will be concentric with the discharge end of one of the tubes 30.

The arrangement of the apertures 29, and the tubes 30, is critical so that when any number of drinks below 32 is desired adjacent glasses only will receive liquid.

For example, in FIGS. 2 and 3 apertures 29A, 29B, 29C and 29D, will receive the tubes 30A, 30B, 30C and 30D. The apertures are in staggered rows, as shown in FIG. 3, to accomplish the proper dispensing of the liquids.

The tubes 30 are extended through suitable bores 35, formed in the member 36, which serves as the top for the compartment 14.

Rectangular cover member 37, having depending side and end walls 39, is arranged to rest on top of the member 36, and serves as an enclosure for the exposed portions of the tubes 30.

The member 15, and the member 36, are spaced from each other by means of spacers 40.

The cover member 37 is provided with a cut out 41, in which is received the outside of the compartment 12. The cover 37 is provided with hand grips 42, so that the device may be carried.

The cover 37 is secured to the side walls 14A of the compartment 14 by means of suitable fasteners 43.

The bottom 44 of the compartment 14 is preferably provided with rubber supports 45, so that the device will not mar a bar, or other resting place for the device. The compartment 14, when not in use, is closed by means of dust covers 46, which are secured by spring means 47 to the side walls and top of the compartment 14.

The bottom 44 of the compartment 14 is provided with a spring detent which serves as a stop 34 for the tray 32. The tray is preferably provided with hand grips 48, so that the tray may be moved in and out of the compartment 14 and carried when loaded with drinks.

In FIG. 6 I illustrate a modified form of distributing member 50, which is intended to be substituted for the elements 30, 36, and 40, of the device as shown in FIG. 2.

The member 50 may be made of wood, or plastic, or other material, and is provided with a flat marginal portion 51, which is intended to receive the side walls 39 of the member 37 (FIG. 2). The member 50 has a maximum thickness approximating the length of the spacers 40, shown in FIG. 2, and has inclined faces 52 and 53 to provide the gravity fall for the distribution of the ingredients of the drinks. The member 50 has a flat upper portion 54 which is arranged to receive thereon the members 15, 16, 17, 18 and 19, comprising the upper compartment 12.

The upper faces 52, 53, and 54 of the member 50 are provided with a plurality of grooves 55, each of which commences at a point immediately below, and in alignment with one of the apertures in the member 15, as at 56, and communicates at the opposite end with a vertical bore 57, formed in the member 50.

It will be understood that there are thirty-two grooves 55, each of which is aligned at one end with one of the apertures 29 in the member 15, and each of which terminates in one of the vertical bores 57, which are individually concentric with one of the glasses 31, shown in FIG. 2.

In FIG. 8 I show a perspective view of one of the measuring cups which I employ with the device, when it is desired to mix fewer than thirty-two drinks. The measuring cup 58 may be made of wood, metal, or plastic, and is in the form of a rectangular tube, having a hinged bottom 59, which is actuated by a pushrod 60, which extends through a bracket 61 fastened to the sidewall of the tube.

The hinged bottom 59 is normally held in closed position by means of a spring 62, which extends between the bracket 61, and the bottom 59. The measuring cup has a flat spring hook 63, whereby it may be suspended on one of the side walls of the upper compartment 12.

It will be understood that I provide a measuring cup which will hold the ingredients for eight drinks, and one which will hold the ingredients for sixteen drinks, so that any multiple of eight drinks may be mixed at once. Other quantities of drinks may be mixed by changing the size of the cups.

In operation the device functions as follows:

The tray 32 is first loaded with the desired number of glasses, which have previously been stocked with ice cubes. The alcoholic beverage is first poured into the compartment 12B, and moved into the distribution compartment 12A, by lifting the partition 24. Because of the uniform diameter of the apertures 29, and the equal distance of fall, the alcoholic beverage will be equally distributed and dispensed into the glasses. After the alcoholic beverage is distributed the desired quantity of mix, or soft drink, is then poured into the compartment 12B, and then by raising the partition 24 it runs into the compartment 12A and is likewise distributed equally to the glasses. When the glasses are filled, the tray 32 is removed and the drinks are distributed to the guests.

When fewer than thirty-two drinks are intended to be mixed, I prefer to insert a measuring receptacle such as shown in FIG. 8, which has the capacity of either eight, or sixteen "shots." When eight, sixteen, or twenty-four drinks are desired to be mixed, the dividing partitions are arranged as previously described, so that the ingredients will reach the proper glasses.

Having described my invention, what I claim and desire to secure by Letters Patent, is:

1. A device of the character described comprising a housing, having an area therein for receiving a plurality of drinking glasses, a receptacle mounted on said housing, said receptacle having two side-by-side compartments separated by a removable wall member, one of said side-by-side compartments being arranged to receive and mix the ingredients for a multiplicity of drinks, the other said side-by-side compartment beng a dispensing compartment having liquid transfer means communicating with its lower portion and glasses positioned in said first named housing area.

References Cited

UNITED STATES PATENTS

| | | | |
|---|---|---|---|
| 215,982 | 5/1879 | Shaw | 222—510 X |
| 516,065 | 3/1894 | Thomas | 141—244 X |
| 574,075 | 12/1896 | Robbins | 141—244 X |
| 2,365,533 | 12/1944 | Elsebusch | 141—332 X |
| 2,718,335 | 9/1955 | Shippen | 222—510 X |
| 1,692,039 | 11/1928 | Hinz | 141—333 |

FOREIGN PATENTS

| | | |
|---|---|---|
| 326,007 | 7/1919 | Germany. |
| 364,862 | 12/1922 | Germany. |

LAVERNE D. GEIGER, *Primary Examiner.*

E. J. EARLS, *Assistant Examiner.*